(12) United States Patent
McClain et al.

(10) Patent No.: US 9,472,102 B2
(45) Date of Patent: Oct. 18, 2016

(54) ADAPTIVE EMERGENCY BRAKE AND STEER ASSIST SYSTEMS BASED ON DRIVER FOCUS

(71) Applicant: Continental Automotive Systems, Inc., Auburn Hills, MI (US)

(72) Inventors: Jeremy Jason McClain, Oxford, MI (US); Zachary Joseph Bolton, Birmingham, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 148 days.

(21) Appl. No.: 14/147,648

(22) Filed: Jan. 6, 2014

(65) Prior Publication Data

US 2014/0195120 A1 Jul. 10, 2014

Related U.S. Application Data

(60) Provisional application No. 61/748,889, filed on Jan. 4, 2013.

(51) Int. Cl.

| | |
|---|---|
| *B60W 30/09* | (2012.01) |
| *G08G 1/16* | (2006.01) |
| *B60T 7/12* | (2006.01) |
| *B62D 6/00* | (2006.01) |
| *G05D 13/02* | (2006.01) |
| *B60W 40/08* | (2012.01) |
| *B60W 10/184* | (2012.01) |
| *B60W 10/20* | (2006.01) |
| *B60W 30/085* | (2012.01) |
| *B60W 50/00* | (2006.01) |

(52) U.S. Cl.
CPC . *G08G 1/16* (2013.01); *B60T 7/12* (2013.01); *B60W 10/184* (2013.01); *B60W 10/20* (2013.01); *B60W 30/09* (2013.01); *B60W 40/08* (2013.01); *B62D 6/001* (2013.01); *G05D 13/02* (2013.01); *B60W 30/085* (2013.01); *B60W 2050/009* (2013.01); *B60W 2050/0094* (2013.01); *B60W 2540/22* (2013.01); *B60W 2540/30* (2013.01)

(58) Field of Classification Search
None
See application file for complete search history.

(56) References Cited

U.S. PATENT DOCUMENTS

| | | | | |
|---|---|---|---|---|
| 6,496,117 | B2* | 12/2002 | Gutta | G08B 21/06 340/521 |
| 7,072,753 | B2* | 7/2006 | Eberle | B60K 28/02 340/438 |
| 7,592,920 | B2* | 9/2009 | Kopf | B60Q 9/008 340/425.5 |

(Continued)

FOREIGN PATENT DOCUMENTS

| | | |
|---|---|---|
| DE | 102006059254 A1 | 6/2008 |
| DE | 102009057766 A1 | 6/2011 |

(Continued)

OTHER PUBLICATIONS

European Search Report for EP Application No. 14150178.3 dated Mar. 21, 2014.

*Primary Examiner* — Redhawn k Mawari
*Assistant Examiner* — Edward Torchinsky

(57) ABSTRACT

An automotive vehicle includes a driver analyzer and a driver assistance system, both of which are coupled to a controller. The controller includes a non-transitory storage medium storing instructions for causing the controller to determine a level of attentiveness of a driver of the automotive vehicle and to adapt a response of the driver assistance system in response to the determined level of attentiveness.

18 Claims, 2 Drawing Sheets

(56) References Cited

U.S. PATENT DOCUMENTS

| | | | |
|---|---|---|---|
| 9,292,471 B2* | 3/2016 | Fung | B60W 40/09 |
| 9,296,382 B2* | 3/2016 | Fung | B60K 28/06 |
| 2008/0046145 A1* | 2/2008 | Weaver | B60T 7/22 |
| | | | 701/41 |
| 2008/0185207 A1 | 8/2008 | Kondoh | |
| 2009/0265071 A1 | 10/2009 | Isaji et al. | |
| 2010/0042303 A1 | 2/2010 | Fiske et al. | |
| 2013/0338878 A1 | 12/2013 | Fritz et al. | |
| 2014/0032093 A1* | 1/2014 | Mills | B60W 40/107 |
| | | | 701/301 |
| 2016/0107653 A1* | 4/2016 | Fung | B60W 40/09 |
| | | | 701/41 |
| 2016/0152233 A1* | 6/2016 | Fung | B60K 28/06 |
| | | | 701/41 |

FOREIGN PATENT DOCUMENTS

| | | |
|---|---|---|
| EP | 1564062 A2 | 8/2005 |
| EP | 1880912 A1 | 1/2008 |
| EP | 2311707 A1 | 4/2011 |
| WO | 2008/072089 A2 | 6/2008 |

\* cited by examiner

ADAPTIVE EMERGENCY BRAKE AND STEER ASSIST SYSTEMS BASED ON DRIVER FOCUS

CROSS-REFERENCE TO RELATED APPLICATIONS

This disclosure claims priority to U.S. Provisional Application No. 61/748,889, which was filed on Jan. 4, 2013 and is incorporated herein by reference.

TECHNICAL FIELD

The present disclosure relates to automotive vehicles, and more particularly to a driver assistance system for an automotive vehicle.

BACKGROUND

Advancements in available sensor technology have led to the ability to improve safety systems for vehicles. Arrangements and methods for detecting and avoiding collisions using the improved sensor technology are being implemented in commercial vehicles and other light vehicles. These systems are referred to as driver assistance systems. Driver assistance systems use sensors located on the vehicle to detect oncoming collisions or similar hazardous events. The driver assistance systems can warn the driver and/or provide evasive maneuvers such as autonomous or assisted braking and/or steering. Driver assistance systems typically rely on external proximity sensors and available vehicle dynamics data to make collision avoidance decisions.

SUMMARY

Disclosed is an automotive vehicle including a driver analyzer communicatively coupled to a controller and a driver assistance system communicatively coupled to the controller. The controller includes a non-transitory storage medium storing instructions for causing the controller to determine a level of attentiveness of a driver of the automotive vehicle and to adapt a response of the driver assistance system in response to the determined level of attentiveness.

Also disclosed is a method of controlling an automotive vehicle including determining a level of a driver's attentiveness by interpreting data from a driver analyzer using a controller and adjusting a response of a driver assistance system based at least partially on the driver's level of attentiveness.

BRIEF DESCRIPTION OF THE DRAWINGS

The present disclosure will become more fully understood from the detailed description and the accompanying drawings, wherein.

DETAILED DESCRIPTION

Figure 1:
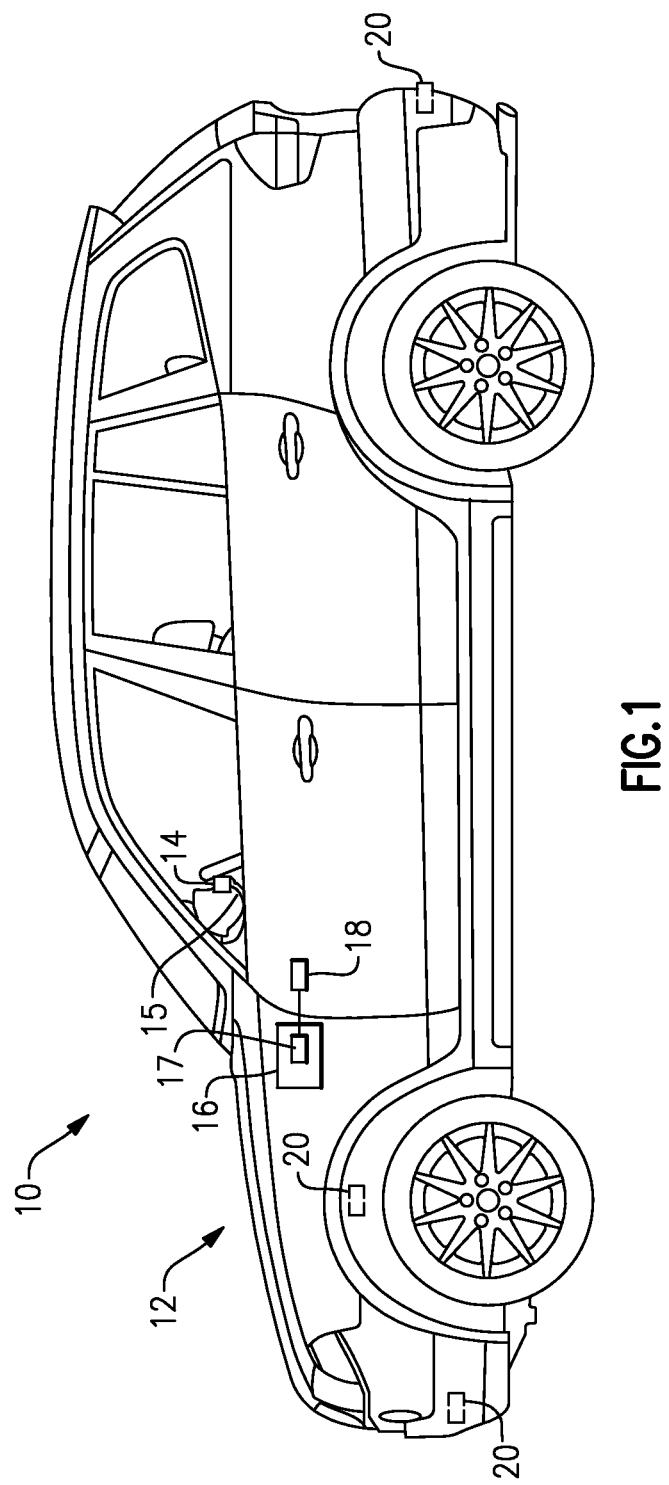
FIG. 1 is a schematic illustration of a vehicle including a driver assistance system.

FIG. 1 illustrates a vehicle 10 including a driver assistance system 12. As is explained in further detail below the driver assistance system 12 incorporates driver focus recognition based on data from a driver analyzer to better assist the driver. The driver assistance system 12 includes a driver analyzer 14 mounted to a steering column 15. The driver analyzer 14 records a driver's head and transmits the head, eye, pupil, eyelid, and/or other facial feature position or information to a vehicle controller 16. The driver analyzer 14 can be a monocular camera, binocular camera, an array of cameras, or another type of sensing device capable of providing information functional to determine the direction of a driver's gaze. Throughout the disclosure, the relative directions of forward and rear are in reference to the direction that an operator for the vehicle 10 would primarily be facing when operating the vehicle 10. In the illustrated example, the driver analyzer 14 is a camera. The controller 16 includes a memory component 17.

The driver analyzer 14 can be mounted in any location that provides a view of the driver's head and/or face position. In some examples, a position in front of the driver is preferred. In the illustrated example, the driver analyzer 14 is mounted on the steering column 15 of the vehicle 10. However, other mounting locations for the driver analyzer 14 may also be considered depending on the structure of the vehicle 10. In an alternate example, the mounting location is at the top and center of the vehicle 10 passenger compartment, proximate to the traditional mounting location for a rear view mirror. In the alternate example, the driver analyzer 14 is mounted in a position that minimizes obstruction of the front windshield. The driver analyzer 14 can be connected to, and used by, other vehicle systems, in particular, other systems which utilize a driver's head position can be connected to the driver analyzer 14.

The controller 16 is communicatively coupled to the driver analyzer 14, and analyzes the image/data from the driver analyzer 14 to determine the direction of the driver's focus. For example, the controller 16 may analyze an image recorded by a camera position of the driver analyzer 14 and determine the position of the driver's eyes, nose, and mouth. Based on the position of the driver's eyes, nose and mouth, the controller 16 can determine the direction of the driver's focus. In some examples, the data from the driver analyzer 14 can also be utilized to recognize the driver via facial recognition and adjust driver specific settings.

In some examples, the controller 16 can also analyze additional information recorded by the driver analyzer 14 to determine the driver's level of attentiveness toward a driving task. In these examples, the controller 16 can use information such as blink rate, eyes open/closed, head movement, etc. to make this determination. In alternate examples, the direction of focus can be used to determine attentiveness.

The controller 16 is also connected to at least one other vehicle system 18. The other vehicle system 18 includes multiple sensors 20. In one example, the other vehicle system 18 is an emergency brake assistance system (referred to as a brake assist system) and the sensors 20 include wheel speed sensors. The brake assist system can alternatively be referred to as "autonomous emergency braking" or "crash imminent braking." Alternately, the other vehicle system can be any other type of driver assistance system. In the brake and steer assist system example, the controller 16, determines the direction of a driver's focus and/or level of the drivers attention level based on the data from the driver analyzer 14. The response provided by the other vehicle system 18 is adapted based on the driver's focus and/or attentiveness. By way of example, the response of the other vehicle system 18 can be a warning delay, an automatic brake time determination, or any similar response. The other vehicle system 18 can be controlled by the same controller 16 or have an independent controller. In the illustrated example, the response of the other vehicle system 18 is adjusted by the controller 16. In alternate examples utilizing an independent controller, the independent controller can adjust the response.

Figure 2A:
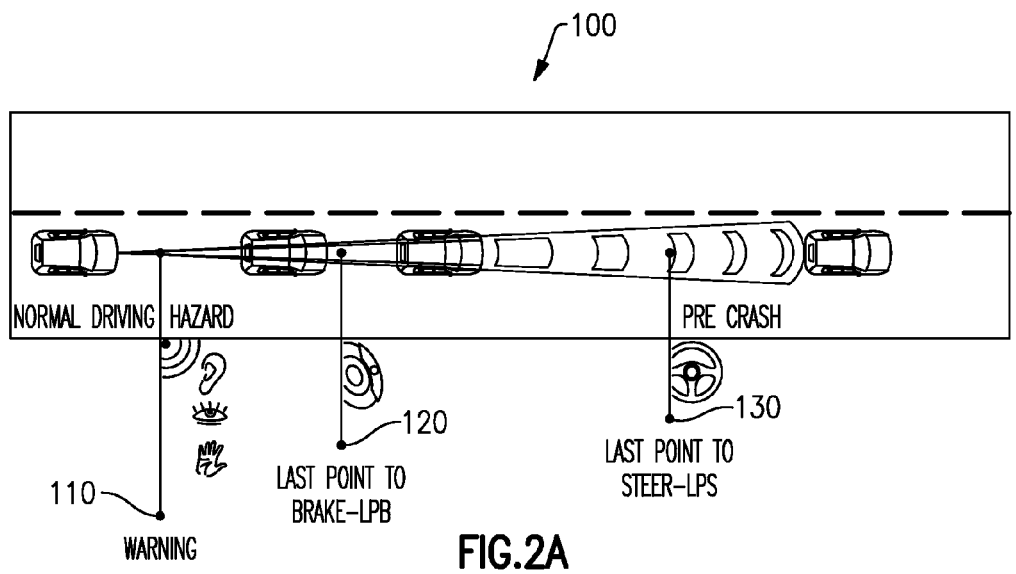
FIG. 2A is a schematic illustration of exemplary brake and steer assist decision points which can be altered by the driver assistance system of FIG. 1.

Referring now to FIG. 2A, a schematic illustration of decision points for an exemplary brake and steer assist system 100 is illustrated in FIG. 2A. In the example of FIG. 1, the brake and steer assist system 100 of FIG. 2A is implemented as the other vehicle system 18. Under normal driving conditions the system 100 determines three decision points 110, 120, 130 for avoiding a collision. First, a warning point 110 when a warning should be issued to the driver, second, a brake point 120 when the last point to brake (LPB) occurs, and third, a steering point 130 when the last point to steer occurs. The brake point 120 and the steering point 130 are the points at which braking (the brake point 120) and steering (the steering point 130) are no longer effective at preventing a collision with a detected object. Additional warnings can be issued in increasing magnitudes as the likelihood of a collision occurs. As such, although only one warning decision point is illustrated in FIG. 2A, a practical system may include multiple warning decision points. Furthermore, other systems may use additional decision points or alternate decision points. As such, the brake point 120 and steering point 130 are exemplary and do not limit the scope of the disclosure.

Figure 2B:
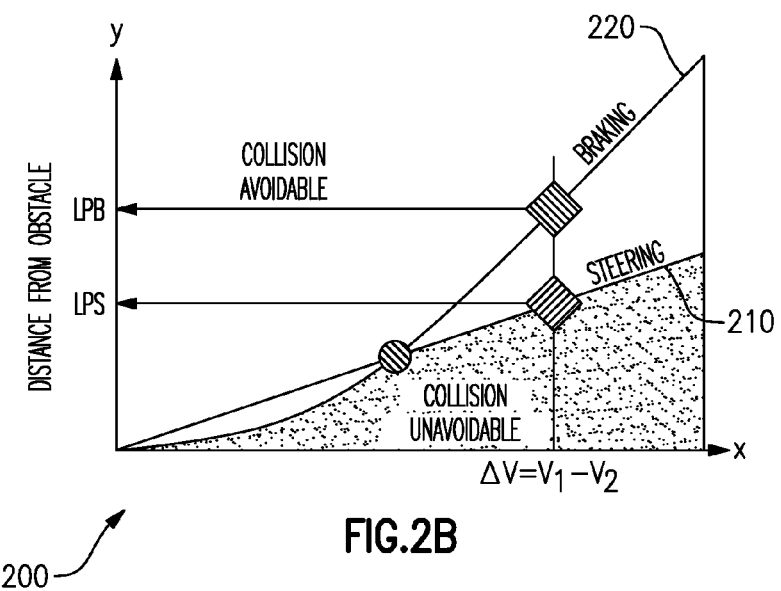
FIG. 2B is an exemplary collision avoidance chart for the driver assistance system of FIG. 1.

With continued reference to FIGS. 1 and 2A, FIG. 2B illustrates a collision avoidance chart 200 utilized by the brake and steer assist system 100. The chart 200 includes a steering line 210 and a brake line 220. The Y-axis of the chart 200 corresponds to a distance between the vehicle 10 and the collision point, and the X-axis corresponds to a speed of the vehicle 10. As one of skill in the art will appreciate, the last point to brake line 220 and the last point to steer line 210 increase (are spaced further from the collision point) as speed increases. Any point below both lines 210, 220 indicates an unavoidable collision.

The controller 16 utilizes the equations illustrated by the chart to determine where an ideal warning point 110 and where the brake, point 120, steering point 130, or any other decision points are under given conditions. In some examples, the controller 16 can store multiple charts 200, with each chart 200 corresponding to a specific condition or set of conditions. The conditions can be icy roads, wet roads, low traction, or any similar conditions. Similarly, the controller 16 can utilize charts corresponding to any combination of conditions. In other examples, the controller 16 can create and store driver specific collision avoidance charts. The driver specific collision avoidance charts can incorporate learned driving patterns and habits of specific drivers to tailor the collision avoidance chart to the driver. While exemplified herein as a single controller 16, it is understood that the functions of a driver assistance system and a driver analyzer can be performed by two distinct controllers that are capable of communicating with each other either directly or through an indirect communication interface.

With continued reference to FIGS. 1, 2A, and 2B, the controller 16 can determine a direction of focus and a level of driver attentiveness based on the analysis of the image from the driver analyzer 14. The controller 16 can then alter the warning point 110 of the brake and steer assist system 100 to compensate for the attentiveness of the driver. This is referred to as altering or adapting the response of the driver assistance system 100.

For example, if the controller 16 determines that the driver is looking away from the forward direction of the vehicle 10 or away from the detected object, the warning signal may be sent earlier. The earlier warning point 110 allows the driver time to re-focus on the instrument cluster and/or the potential collision zone. Alternatively, the warning signal may be sent to a different location in the vehicle 10 that is currently visible to the driver, based on the driver's current direction of focus, the intensity of the warning may be increased, etc. In other examples if the controller 16 determines that the driver is paying attention (has a high level of attentiveness) the vehicle reaction may be altered in another manner, e.g. decreasing the intensity of the warning or delaying the warning point 110.

By utilizing the driver analyzer 14 and the controller 16 to determine the driver's focus and attention level, more specific settings can be used by the other vehicle systems 18, including the above described brake and steer assist system 100. Additional other vehicle systems 18 that may adapt response times and decision points based on a driver awareness determined by the driver analyzer 14 and controller 16 in a similar manner to the manner described above include: Brake Assist systems, Steering Assists systems, Warning systems, Electronic Stability Control systems, Adaptive Cruise Control, collision Warning systems, Lane Departure Warning, etc.

In one example, the controller 16 can instruct an adaptive cruise control system to increase the gap between vehicles when the driver has a low attentiveness level, or when the driver's focus is frequently not in the forward direction.

In another example, the controller 16 can instruct a lane departure system to not provide a warning, decrease a warning level, or provide less frequent warnings when the controller 16 determines that the driver is focused and paying attention (has a high level of attentiveness). Situations such as the one described above, allow for variance in vehicle handling by the driver without providing unnecessary warnings, such as in construction zones when lane changes may be improperly detected or in driving conditions requiring a driver to drive near the edge of a lane, e.g. while pulling a trailer.

As noted previously, the driver analyzer 14 and controller 16 may also be used to recognize a particular driver of a vehicle 10 and adjust the vehicle performance accordingly. If a driver is a frequent operator of a vehicle 10, the driver assistance system 12 can recognize the driver and apply know driver preferences or settings to the vehicle 10 performance. For example, a driver can input a preference for maximizing fuel economy or vehicle speed. The driver assistance system 12 can adjust the response of other vehicle systems 18, such as the brake and steer assist system 100, according to the known preference to provide the desired action. Response times, decision points and warning times can also be adjusted based upon a known driver, e.g when the driver is inexperienced or older the response times can be increased.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:
1. An automotive vehicle comprising:
a driver analyzer communicatively coupled to a controller;

a driver assistance system communicatively coupled to the controller; and the controller including a non-transitory storage medium storing instructions for causing the controller to determine a level of attentiveness of a driver of the automotive vehicle and to adapt a response of the driver assistance system in response to the determined level of attentiveness and in response to at least one condition external to the vehicle, the condition external to the vehicle being an environmental condition affecting at least one of a last point to brake and a last point to steer, and wherein adapting the response of the driver assistance system includes loading one of a plurality of collision avoidance charts including at least a last point to brake data entry and a last point to steer data entry, each of said collision avoidance charts being distinct and corresponding to at least one environmental condition.

2. The automotive vehicle of claim 1, wherein the driver assistance system is at least one of a brake assist system, a steering assist system, a warning system, an electronic stability control system, an adaptive cruise control system, a collision warning system and a lane departure warning system.

3. The automotive vehicle of claim 1, wherein the non-transitory storage medium further stores instructions for causing said driver assistance system to determine a direction of the driver's focus based at least in part on data from the driver analyzer.

4. The automotive vehicle of claim 1, wherein the driver analyzer is one of a monocular camera, a binocular camera, and an array of cameras.

5. The automotive vehicle of claim 1, wherein the driver analyzer is mounted to a steering column of the automotive vehicle.

6. The automotive vehicle of claim 1, wherein one of the driver analyzer and the controller include a driver recognition module, and wherein the driver recognition module is operable to interpret data from said driver analyzer and thereby determine a specific driver of the vehicle.

7. The automotive vehicle of claim 1, wherein the driver assistance system is a module of said controller.

8. A method of controlling an automotive vehicle comprising:
   determining a level of a driver's attentiveness by interpreting data from a driver analyzer using a controller;
   identifying a specific driver using the controller based on data from the driver analyzer, at least in part by identifying the specific driver using facial recognition;
   loading a specific driver profile from a controller memory, the specific driver profile corresponding to the identified specific driver; and
   adjusting a response of a driver assistance system based at least partially on the driver's level of attentiveness and at least partially on at least one condition external to the vehicle, the condition external to the vehicle being an environmental condition affecting at least one of a last point to brake and a last point to steer, and
   wherein adjusting the response of the driver assistance system includes loading one of a plurality of collision avoidance charts including at least a last point to brake data entry and a last point to steer data entry, each of said collision avoidance charts being distinct chart and corresponding to at least one environmental condition.

9. The method of claim 8, wherein the driver assistance system is at least one of a brake assist system, a steering assist system, a warning system, an electronic stability control system, an adaptive cruise control system, a collision warning system and a lane departure warning system.

10. The method of claim 8, further comprising adjusting the driver assistance system in response to the specific driver profile.

11. The method of claim 8, wherein determining the level of the driver's attentiveness by interpreting data from the driver analyzer using a controller comprises:
    capturing at least one image of the driver using a camera;
    identifying a plurality of facial features of the driver; and
    determining a facing of the driver relative to a direction of motion of the vehicle based on the position of the a plurality of facial features in the at least one image.

12. The method of claim 11, wherein the a plurality of identified facial features includes at least one of an eye, mouth and nose.

13. The method of claim 11, wherein a high level of attentiveness is determined in response to the driver's facing substantially matching one of the direction of travel of the vehicle and a potential collision object external to the vehicle.

14. The method of claim 11, wherein a low level of attentiveness is determined in response to at least one of the driver's facing and focus direction substantially deviating from at least one of the direction of travel of the vehicle and a potential collision object external to the vehicle.

15. The method of claim 8, wherein adjusting a response of a driver assistance system comprises at least one of delaying a warning point in response to determining a high level of attentiveness and increasing a time period between the warning point and a first of a brake point and a steering point in response to determining a low level of attentiveness.

16. A method of controlling an automotive vehicle comprising:
    determining a level of a driver's attentiveness by interpreting data from a driver analyzer using a controller;
    adjusting a response of a driver assistance system based at least partially on the driver's level of attentiveness;
    loading a collision avoidance chart using said driver assistance system, wherein the collision avoidance chart includes compensation for at least one condition external to the vehicle; and
    wherein adjusting a response of a driver assistance system based at least partially on the driver's level of attentiveness comprises adjusting at least one of a warning point, brake point, steering point, warning intensity and warning location in response to a determined level of driver attentiveness.

17. The method of claim 16, wherein the at least one condition external to the vehicle is at least one of an icy road, a wet road, and low traction.

18. The method of claim 16, wherein loading the collision avoidance chart using said driver assistance system comprises selecting a collision avoidance chart from a plurality of collision avoidance charts, the selected collision avoidance chart including the compensation for the at least one condition external to the vehicle.

* * * * *